United States Patent
Laub

[11] 3,796,495
[45] Mar. 12, 1974

[54] APPARATUS AND METHODS FOR SCANNING PHASE PROFILOMETRY

[75] Inventor: Leonard Laub, Chicago, Ill.

[73] Assignee: Zenith Radio Corporation, Chicago, Ill.

[22] Filed: May 30, 1972

[21] Appl. No.: 257,721

[52] U.S. Cl. .................. 356/109, 356/111, 350/161
[51] Int. Cl. ............................................. G01b 9/02
[58] Field of Search ........................ 356/106–113; 350/161

[56] References Cited
UNITED STATES PATENTS
3,523,735   8/1970   Taylor ................................ 356/106
3,493,759   2/1970   Adler ................................. 350/161

*Primary Examiner*—Ronald L. Wibert
*Assistant Examiner*—Conrad Clark
*Attorney, Agent, or Firm*—John H. Coult

[57] ABSTRACT

This disclosure depicts methods and apparatus for detecting minute phase variations on reflective or transmissive specimens. A scanning phase profilometer is depicted which includes means for producing from a coherent input light beam a set, here shown as a pair, of distinguishably coded interrogating beams which are focused and scanned across a specimen as a pair of slightly displaced light spots. The interrogating beams are recombined after interaction with the specimen. Phase demodulating means are provided including a light responsive means in the path of the recombined interrogating means for detecting phase variations between the interrogating beams caused by optical path length variations as the beams are scanned across the specimen. Means are provided for producing an electrical phase differential signal characterizing the detected phase variations and electrical integrating means for integrating the phase differential signal to produce a signal characterizing the phase profile of the scansion across the specimen. Methods and apparatus for producing a two-dimensional display of the phase profile of a specimen are also disclosed.

6 Claims, 4 Drawing Figures

PATENTED MAR 12 1974   3,796,495
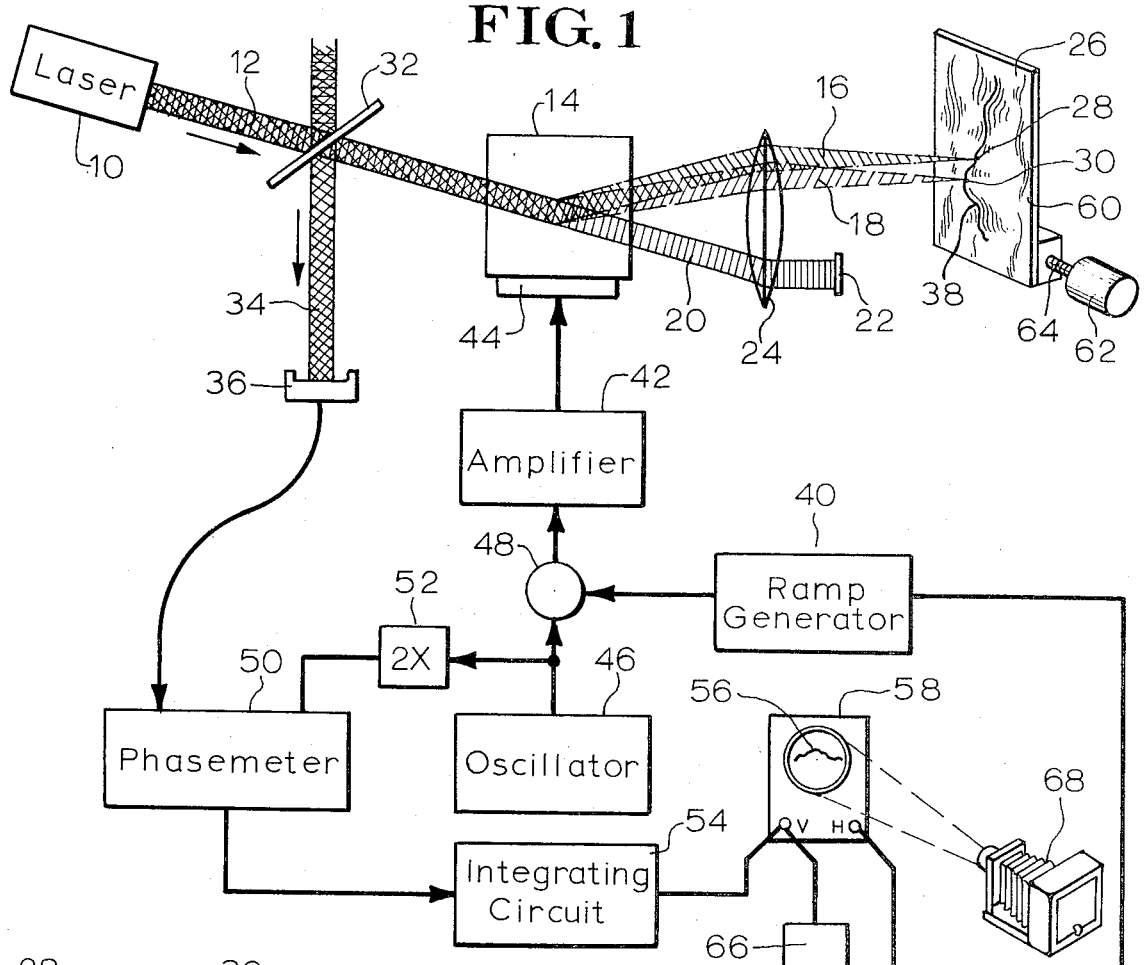
FIG. 1
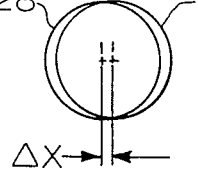
FIG. 2A
FIG. 2
FIG. 3

APPARATUS AND METHODS FOR SCANNING PHASE PROFILOMETRY

BACKGROUND OF THE INVENTION

This invention relates in general to methods and apparatus for examining phase objects and specimens at very high resolution. A substantial body of prior art has developed and a substantial amount of effort has been expended to develop ways for visualizing and analyzing phase images of the type comprising either variations in optical index of refraction or variations in height.

The prior art which appears to be most relevant in respect to the present invention is believed to be: 1) the apparatus and methods of Nomarski differential interference contrast microscopy, and 2) certain apparatus and methods for detecting traveling surface wave patterns which have been developed by my co-workers, Korpel and Whitman.

The Nomarski differential interference contrast system is described in an article by Robert R. Smith in "Photographic Applications in Science, Technology and Medicine," May 1971, pages 19–22. According to this method, a polarized input light beam is split by a first Wollaston prism into a pair of oppositely polarized interrogating beams which are shifted slightly to create an optical displacement or "shear." The interrogating beams are caused to illuminate an area of the specimen, after which they are recombined by a second Wollaston prism, and analyzed by a polarization analyzer. Upon recombination of the interrogating beams, as a result of the shear between the beams, an interference pattern is created which depicts as areas of varying brightness variations in phase slope.

Whereas the Nomarski system has proved to be very useful to microscopists in revealing phase details, it nevertheless has a number of drawbacks. First, it may erroneously display as phase information intensity effects due to light absorption, scattering, or reflection. Secondly, being a purely optical system, phase information detected is normally displayed as an optical image in which intensity variations correspond to changes in phase slope, rather than to optical path length variations. Thirdly, the phase images obtained by a Nomarski system are not capable of being electronically processed, and thus are limited in their informational content.

The system of Korpel and Whitman referred to above is described in an article, "Probing of Acoustic Perturbations by Coherent Light," appearing in Applied Optics, Volume 8, August 1969 on pages 1572-3. The Korpel et al system comprises an acousto-optic Bragg cell for dividing an input laser beam into a diffracted beam and a zero order beam. The diffracted beam is focused on the specimen and acts as an interrogating beam; the zero order beam is focused on a separate stationary mirror which serves as a phase reference surface. The diffracted interrogating beam is reflected from the specimen back through the Bragg cell where it is recombined with the zero order reference beam which has been reflected from the reference surface. The recombined beams are photodetected and phase demodulated to derive a time varying signal representing the changing optical path length of the interrogating beam.

Whereas the Korpel et al system also has provided very satisfactory results, it is sensitive to vibration and thus is not as stable in a working environment as could be desired. Further it is incapable of unambiguously depicting total phase profile variations greater than one-half wavelength of the interrogating light beam.

It is a general object of this invention to provide apparatus and methods for detecting minute optical path length variations on a specimen.

It is a more specific object of this invention to provide methods and apparatus of scanning phase profilometry which provide extreme sensitivity to phase variations across an examined specimen, and yet which offer relative insensitivity to vibration.

It is another object to provide methods and apparatus of scanning phase profilometry which offer substantial insensitivity to absorption, scattering or variable reflection of interrogating light.

It is another object to provide methods and apparatus of scanning phase profilometry by which arbitrarily large total phase variations on a specimen can be unambiguously detected.

It is still another object to provide such apparatus which produce time-varying phase signals capable of being electronically processed, and which is capable of producing an output representing directly the phase profile of the scanned specimen.

It is yet another object to provide methods and apparatus of phase profilometry by which a two-dimensional display of the phase profile of a specimen may be produced.

Further objects and advantages of the invention will in part be obvious and will in part become apparent as the following description proceeds: The novelty which characterizes the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein:

FIG. 1 is a schematic illustration of a scanning phase profilometer constructed in accordance with the principles of this invention;

FIG. 2 is a diagram representing an enlarged view of a specimen being scanned by the FIG. 1 system which may be useful in understanding the invention;

FIG. 2A is a schematic illustration of a pair of overlapped light spots produced by the FIG. 1 system; and FIG. 3 is a representation of a two-dimensional phase profile display which may be produced according to the methods and apparatus of this invention.

DESCRIPTION OF THE PREFERRED EMBODIMENT

This invention concerns methods and apparatus for detecting minute phase variations on a specimen, involving producing from a coherent input light beam a set of interrogating beams which are focused on a specimen to be inspected and caused to scan relative to the specimen. The interrogating beams are collected after interaction with the specimen and recombined for electronic processing. Phase information representing optical path length differences between the interrogating beams is sensed with a photodetector and detected by phase demodulating means. An electrical phase differential signal is produced, which is electrically integrated to produce a signal characterizing the phase profile of the scansion across the specimen.

FIG. 1 illustrates schematically a preferred structural implementation of the principles of the invention. Referring to FIG. 1, a source of coherent light such as a laser 10 produces an input light beam 12 having a predetermined optical center frequency, herein designated $f_0$. The input light beam 12 is directed into an acousto-optic Bragg cell 14 which may be of conventional construction. The Bragg cell 14 and associated sound wave generating apparatus, described in detail below, diffract from the input beam 12 a set, here shown as a pair, of interrogating light beams 16, 18 which are distinguishably coded. Although a number of different codes may be employed, in the illustrated preferred form of the invention, as described in more detail below, the interrogating beams 16, 18 are coded by causing them to have slightly different optical center frequencies (different center wavelengths).

In addition to the diffracted interrogating beams 16, 18 a zero order (DC) beam is also transmitted through the cell 14 where it is subsequently absorbed or otherwise removed by means such as a stop 22. Lens means, here shown in the interest of simplicity as a simple biconvex lens 24, is provided for focusing, the interrogating beams onto a specimen 26 whose phase profile characteristic is to be detected.

Whereas the FIG. 1 illustration shows the interrogating beams 16, 18 as being focused to a pair of spots 28, 30 which are separated in space, in practice (as will be described in more detail below) the spots are caused to overlap substantially with a relatively small displacement or "shear" between them. See FIG. 2A. The lens 24 is spaced a focal length away from the specimen 26 and is preferably also spaced a focal length away from the Bragg cell 14.

In the embodiment illustrated in FIG. 1, the specimen 26 is assumed to be reflective in nature and to have a phase profile which is characterized by variations in the actual height (thickness) thereof. As will be explained below, the principles of this invention are also applicable to transmission systems wherein the specimen may have a uniform height profile, but is characterized by having variations in its index of refraction, or both thickness and index of refraction variations.

In the illustrated reflection system, the interrogating beams 16, 18 are reflected from the specimen 26 and collected by the lens 24 which in turn redirects them into the Bragg cell 14. In the cell 14 the beams 16, 18 are again diffracted and coaxially recombined. The recombined interrogating beams are partially reflected by a beam-splitting mirror 32 to form an output beam 34 which impinges upon a photodetector, shown schematically at 36.

According to this invention, the phase profile of the specimen 26 is determined by first detecting the phase differential between the interrogating beams 16, 18 which results from differences in the optical path lengths of the interrogating beams 16, 18 as they reflect from the specimen 26. In order to promote an understanding of the phase differential principle on which the methods and apparatus of this invention are predicated, reference may be had to FIG. 2 which represents an enlarged schematic view of the interrogating beams 16, 18 as they impinge upon the specimen 26.

As shown in FIG. 2, the surface 38 of the specimen 26 can be described as having a spatially varying height function $h(x)$, where $x$ is the distance along the surface in the direction in which a profile is to be determined. The light spots 28, 30 (which are in practice greatly overlapped) are shown as being separated by a distance $\Delta x$. The height difference between the spots 28, 30 is designated $\Delta h$.

In systems following this invention, $\Delta x$ is preferably maintained constant. The optical path length difference, and hence the phase difference, between beams 16, 18 is $2\Delta h$. The phase difference can be described as $\phi = (4\pi/\lambda)\Delta x(dh(x)/dx)$.

It can thus be seen that the phase differential between the interrogating beams is proportional to the slope of the specimen surface 38. It is important to note that this phase differential relationship is unrelated to any difference in reflectivity, scattering or absorption at the two points, and thus that variations in beam amplitude caused by such intensity-affecting factors do not affect the phase differential signal.

Returning to the FIG. 1 illustration, the sound wave generating means for driving the Bragg cell 14 and means for demodulating the described phase signal impressed upon the returned interrogating beams will now be described. In conjunction with this description, means will be described for causing the interrogating beams 16, 18 to sweep in unison and with constant spacing across the specimen 26 in order to derive a one-dimensional phase profile trace across the specimen.

In the illustrated preferred embodiment, a ramp of sound frequencies is fed into the cell 14 to cause the interrogating beams 16, 18 to scan across the specimen. As is well known, driving the cell 14 with a sound frequency ramp causes the angle of diffraction of the interrogating beams to vary.

FIG. 1 illustrates a frequency ramp generator 40 for developing a frequency ramp signal $f_s$ which is supplied to an amplifier 42. The amplifier feeds an electro-acoustic transducer 44, which may be of well known construction, for developing a pattern of sound waves within the cell 14 capable of performing the described diffraction of the input beam 12.

As described above, in the illustrated preferred embodiment the interrogating beams 16, 18 are caused to be distinguishable by their having different optical frequencies. To this end, an audio oscillator 46 develops a continuous wave signal of frequency $f_m$ which is fed to a mixer 48 for mixing with the frequency ramp signal from the ramp generator 40. The mixer 48 is preferably a balanced mixer in order that the carrier frequency $f_m$ and the ramp frequencies $f_s$ are suppressed. By way of example, in a system constructed and successfully tested, the frequency ramp generator was caused to generate a spectrum of frequencies varying from about 18MHz to about 36 MHz and the oscillator 46 was to generate a frequency $f_m$ of about 10kHz.

At the output of the mixer 48 is developed continuous wave signals having frequencies $f_s + f_m$ and $f_s - f_m$. Upon generation of sound wave fields in the cell 14 of frequencies $f_s + f_m$ and $f_s 31 f_m$, the input beam 12 is diffracted to produce the said interrogating beams 16, 18.

It can be seen that the angular separation of the beams 16, 18 and thus the spatial displacement (the shear) of the spots 28, 30 can be easily predetermined by selection of an appropriate frequency for the signal $f_m$ generated by the oscillator 46. It is also evident that as the frequency ramp signal sweeps through its spectrum of frequencies, the spots 28, 30 are caused to sweep in unison and with constant spacing across the specimen 28.

The optical frequencies of the Doppler-shifted interrogating beams 16, 18 can be described as having respective optical frequencies $f_0 + f_s + f_m$ and $f_0 + f_s - f_m$. Upon reflection from the specimen 38, the interrogating beams 16, 18 are again diffracted by the Bragg cell 14, producing from interrogating beam 16 a first pair of beams (not separately shown) having optical frequencies of $f_0 + 2f_s + 2f_m$ and $f_0 + 2f_s$, and from interrogating beam 18 a second pair of beams (not separately shown) having optical frequencies $f_0 + 2f_s - 2f_m$ and $f_0 + 2f_s$. Each of these beams carries phase information about the specimen.

Upon impinging on the photodetector 36, the collection of beams constituting the output beam 34 interfere, producing a number of harmonically related beat signals. Each of these beat signals carries phase differential information. In order to visualize the interference effects taking place at the photodetector 36, one may think of each of the component light beams in the output beam 34 as acting as a local oscillator for each of the others. Thus it can readily be seen that the said first pair of beams (having frequencies $f_0 + 2f_s + 2f_m$ and $f_0 + 2f_s$) will beat with the said second pair of beams (having frequencies $f_0 + 2f_s - 2f_m$ and $f_0 + 2f_s$) to produce beat signals at $2f_m$ and $4f_m$.

It is extremely important to understand the significance of having specimen phase information phase-modulating one or more carriers which may be demodulated to retrieve specimen phase information which is unaltered by intensity effects such as absorption, scattering and variable reflection. As discussed above, the displays produced by the prior art Nomarski system in some applications suffer from degradation by such intensity effects.

In accordance with this invention a selected one or more of the phase differential signals which are concurrently detected by the photodetector 36 is phase demodulated. This is accomplished in the illustrated preferred embodiment by a synchronous phase detector, receiving an output signal from photodetector 36 and a local oscillator signal from oscillator 46. In the illustrated preferred embodiment, the beat signal which is selected to be phase detected is the signal having a frequency $2f_m$.

In order to provide a local oscillator signal at this frequency, the output from oscillator 46 is frequency doubled in a doubler 52 before being supplied to the phasemeter 50. It may be noted at this point that a DC amplitude-modulated signal carrying specimen reflectivity information can be derived from the phasemeter 50, although such is not used in the preferred embodiment illustrated.

The output signal from the phasemeter 50 is a time-varying signal which is proportional to the optical path length differential between the spots 28, 30 which is in turn proportional to the slope, i.e. the first derivative, of the specimen surface 38.

In order to convert this time-varying slope signal into a time-varying signal characterizing the actual phase profile (in the illustrated embodiment, the height profile) of the scansion across the specimen, the phasemeter output signal is electrically integrated in an integrating circuit 54. By causing the frequency ramp signal to be linear, integration can be achieved with an integrating circuit comprising a single section RC low pass filter of well known construction. The described integration does not yield an absolute phase profile, however in practice, complete utility of the integrated signal can be achieved by assuming that the location of the profile trace at the beginning of a scan is at a reference height zero.

The phase profile signal in the output of the integrating circuit 54 may be displayed as a phase profile trace 56 on a display device such as an oscilloscope 58.

In a system successfully tested the width of the spots 28, 30 was caused to be about 0.4 micrometers. The spot displacement (the shear $\Delta x$ in FIG. 2) was caused to be approximately 0.015 micrometers. It is to be noted that the amount of shear which is appropriate for a given application is a function of the desired phase resolution (theسensitivity to phase variations).

It will be evident that the greater the shear between the scanning spots 28, 30 the greater will be the optical path length difference between interrogating beams 16, 18 for a given phase slope on the specimen. For a given minimum detectable optical path length difference, it can easily be seen that this minimum difference will correspond to a gentler phase slope as the shear is increased.

The limit of optical path length difference between the interrogating beams 16, 18 (the range of $\Delta h$ in FIG. 2) that can be tolerated is determined by the wavelength of the input light beam 12 and the degree of linearity required. The optical path length difference $2\Delta h$ between the beams 16, 18 is preferably caused to be small relative to the wavelength of the input beam, for example 0.5 radian.

It is important to note that in accordance with this invention there is derived a phase differential signal which is subsequently integrated to produce a phase profile signal. By this expedient, a much greater range of phase height or gross optical path length difference can be detected than with the Korpel et al system. In these prior art systems phase reversal effects act to limit the range of phase profiles which can be faithfully detected.

The transverse resolution of the FIG. 1 system, that is the resolution in the plane of the specimen, as with any microscope, is a function of the numerical aperture of the microscope objective employed. It is to be noted in this connection that, if the shear is maintained small relative to the spot size, there is no significant reduction in transverse resolution resulting from scanning with a pair of spots rather than with a single spot.

It is manifest that increasing the spot size will decrease the ability of the FIG. 1 system to discern phase details in the direction of scan. It would appear then that the best results would be achieved using a microscope objective having the greatest possible numerical aperture. Such is not the case however in applications such as that depicted in FIG. 1 wherein the height profile of the examined specimen may have a height excursion which is greater than the depth of focus provided by a high numerical aperture microscope objective.

As is well known, the depth of focus of a lens varies inversely as the square of the numerical aperture. If the depth of focus of the lens 24 is exceeded in a system, according to this invention, the system remains operative; however, the transverse resolution is degraded in proportion to the increase in spot size. Thus in applications wherein the examined specimen has a great height excursion, a trade-off may have to be made between spot size and the depth of focus in order to achieve a minimum average spot size (and thus a maximum average transverse resolution) for a given scansion across the specimen. In a system constructed and successfully tested wherein a maximum optical path length $\Delta h$ to be encompassed was approximately 1 micron, a microscope objective was employed having a numerical aperture of 0.5, yielding a depth of focus of approximately 1 micron.

The FIG. 1 system has been described thus far in terms of its capability of providing a one-dimensional phase profile of a scansion across the specimen 26. In accordance with one aspect of this invention, means are provided for producing a two-dimensional display in the form of a spatial succession of phase profile traces across the specimen. To this end, means are provided for causing a relative raster scanning movement between the pair of interrogating beams 16, 18 and the specimen 26. A number of structures are contemplated which would be suitable for achieving an X-Y scan of the specimen.

In the illustrated FIG. 1 embodiment, means are provided for translating the specimen 26 in a plane containing the specimen in a direction orthogonal to the sweep of the interrogating beams 16, 18 caused by the Bragg cell 14. FIG. 1 illustrates very schematically means for translating the specimen, comprising a platen 60 which is driven by means of a motor 62 through a screw mechanism 64. It is within the compass of this invention to deflect the interrogating beams 16, 18 in an X-Y raster scanning mode while maintaining the specimen stationary, or alternatively, to move the specimen in an X-Y raster scanning mode while maintaining the interrogating beams stationary.

In a system as shown in FIG. 1 which has been successfully reduced to practice, the interrogating beams were caused to scan a line 20 micrometers long across the specimen approximately 30 times per second while the specimen was moved by a mechanical translator at a much slower rate, namely 10 micrometers per second.

In order to display the two-dimensional phase profile information developed, the signal may be supplied to an oscilloscope 58, as shown, whose trace is caused to drift vertically by means of a vertical drive circuit 66. By this arrangement, a succession of phase profile traces developed may be displayed simultaneously on the screen of the oscilloscope 58. The oscilloscope display may be recorded by a photographic camera 68, or alternatively may be displayed with an oscilloscope having a long persistence phosphor.

FIG. 3 illustrates in unequal X-Y-Z scale a reproduction of an actual photograph of an oscilloscope display developed using a system as shown in FIG. 1. FIG. 3 depicts the two-dimensional phase profile of a group of blood cells. The FIG. 3 illustration represents a spatial succession of profile slices through the specimen which are recorded spatially displaced on the face of the oscilloscope screen.

To given an indication of the phase sensitivity and transverse resolution achievable with the FIG. 1 system, the maximum height of the phase profile traces in the FIG. 3 illustration is less than 1.0 micrometers; the average width of the illustrated blood cells is approximately 8 micrometers.

It can be understood from the above description that the methods and apparatus of this invention provide phase profile information which is undegraded by variations in amplitude of the returned interrogating beams resulting from absorption, scattering, reflectivity variations and other amplitude-affecting factors. By the use of a pair of nearly coincident beams, rather than a single interrogating beam and a spatially remote reference beam as taught by Korpel et al, a system is provided which is highly insensitive to vibration and which is capable of detecting and reproducing arbitrarily great phase excursions on a specimen. Thus a system is provided which overcomes the primary deficiencies of the Nomarski differential interference contrast system and the Korpel et al, scanning system, and yet which retains the primary benefits of each of these systems.

As discussed, insensitivity to amplitude variations in the interrogating beams is achieved according to this invention by effectively placing the interrogating beams on carriers which can be beat to detect phase differential information. By contrast, the Nomarski system operates by creating a DC interference pattern which displays as phase information (or which displays information which is indistinguishable from phase information) amplitude affects produced by absorption, scattering, and reflectivity variations. Further, by this invention there is produced a time varying electronic signal which is capable of being electrically processed to derive information not practically obtainable from a purely optical display.

Structural implementations other than and different from those described above are within the purview of this invention. For example, a transmission version of the FIG. 1 reflection system may be constructed by adding in mirror image fashion about the specimen a second lens and Bragg cell corresponding to the Bragg cell 14 and lens 24 shown in the FIG. 1 system.

The invention is not limited to the particular details of construction of the embodiments depicted and other modifications and applications are contemplated. Certain changes may be made in the above described methods and apparatus without departing from the true spirit and scope of the invention herein involved and it is intended that the subject matter in the above depiction shall be interpreted as illustrative and not in a limiting sense.

I claim:

1. For use with a coherent input light beam, a scanning phase profilometer for detecting minute phase variations across a specimen, comprising:

means including an acousto-optic Bragg cell and associated sound wave generating apparatus for producing from the input beam by diffraction a pair of mutually coherent interrogating beams having different optical frequencies, for focusing the interrogating beams on the specimen, for collecting and recombining said interrogating beams after interrogation of the specimen, and for causing said pair of interrogating beams to scan the specimen in unison and with constant angular displacement;

phase demodulating means including light-responsive means in the path of the recombined interrogating beams for detecting phase variations between said interrogating beams caused by optical path length variations as said beams are scanned across the specimen and for producing an electrical phase differential signal characterizing said variations; and electrical integrating means responsive to said phase demodulating means for integrating said phase differential signal to produce a signal characterizing the phase profile of the scansion across the specimen.

2. The apparatus defined by claim 1 wherein said sound wave generating means includes oscillator means for generating a selectable fixed audio frequency continuous wave carrier signal $f_m$, a frequency ramp generator for generating a ramp signal $f_s$ sweeping through a range of megahertz frequencies, a mixer for mixing said carrier signal and said ramp signal to produce continuous wave signals having together-sweeping frequencies $f_s+f_m$ and $f_s-f_m$ and transducer means coupled to said Bragg cell for converting the output signal from said mixer into sound waves in said cell.

3. The apparatus defined by claim 1 wherein the specimen is light-reflective and wherein said Bragg cell means comprises a single cell which diffracts the input beam and which receives and acts on the interrogating beams after reflection from the specimen.

4. For use with a coherent input light beam having an optical center frequency $f_0$, a scanning phase profilometer for detecting minute phase variations across a specimen, comprising:

means including acousto-optic Bragg cell means and associated sound wave generating means for diffracting from the input beam a pair of interrogating beams having different optical frequencies $f_1$ and $f_2$ and for recombining said interrogating beams after interrogation of the specimen, and for causing said interrogating beams to scan across the specimen in unison and with constant angular displacement, the frequency separation of $f_1$ and $f_2$ from $f_0$ and from each other being very small relative to $f_0$, said sound wave generating means comprising oscillator means for generating a selectable fixed audio frequency continuous wave carrier signal $f_m$, a frequency ramp generator for generating a ramp signal $f_s$ sweeping through a range of megahertz frequencies, a mixer for mixing said carrier signal and said ramp signal to produce continuous wave signals having together-sweeping frequencies $f_s+f_m$ and $f_s-f_m$, and transducer means coupled to said Bragg cell means for converting said continuous wave signals from said mixer into sound waves in said cell which produce by diffraction said optical beams of optical frequencies $f_1$ and $f_2$, respectively;

optical lens means for focusing the interrogating beams on the specimen and for collecting and recombining said beams after interaction with the specimen;

phase demodulating means including light-responsive means in the path of the recombined interrogating beams coupled to said oscillator means for detecting phase variations between said interrogating beams caused by optical path length variations as said beams are scanned across the specimen and for producing an electrical phase differential signal characterizing said variations; and electrical integrating means responsive to said phase demodulating means for integrating said phase differential signal to produce a signal characterizing the phase profile of the scansion across the specimen.

5. The apparatus defined by claim 4 including means for effecting relative movement between said pair of interrogating beams and the specimen in a direction transverse to the direction of relative movement introduced by said sound wave generating means, and further including means coupled to said integrating means for producing a two-dimensional display in the form of a spatial succession of phase profile traces representing the phase profiles of a corresponding spatial succession of scansions across the specimen.

6. The system defined by claim 5 wherein the specimen is light-reflective and wherein said Bragg cell means comprises a single cell which diffracts the input beam and which receives and acts on the interrogating beams after reflection from the specimen.

* * * * *